April 14, 1936.  F. A. HOLBY  2,037,024
TANK TRUCK
Filed April 7, 1934  4 Sheets-Sheet 1
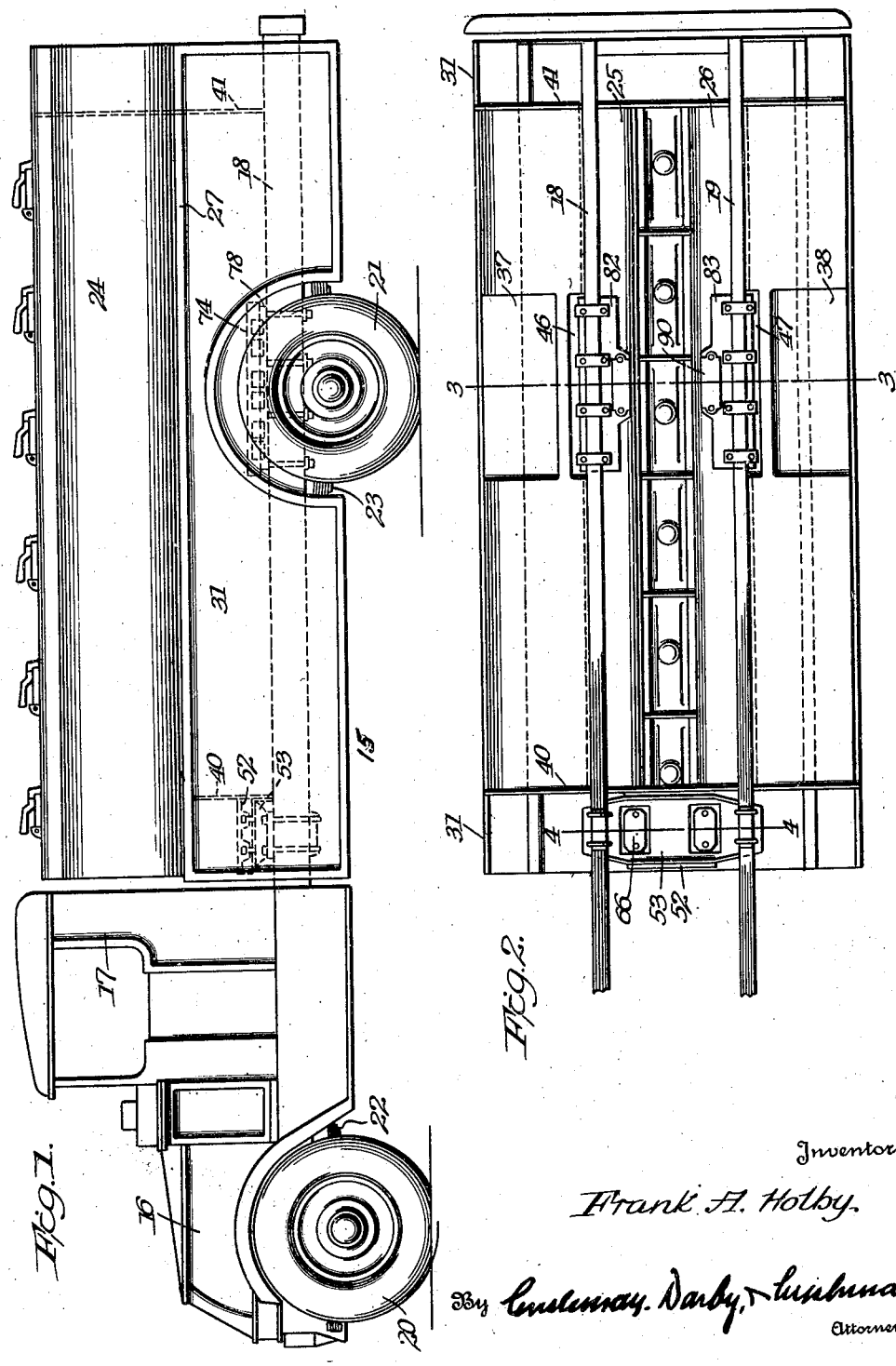

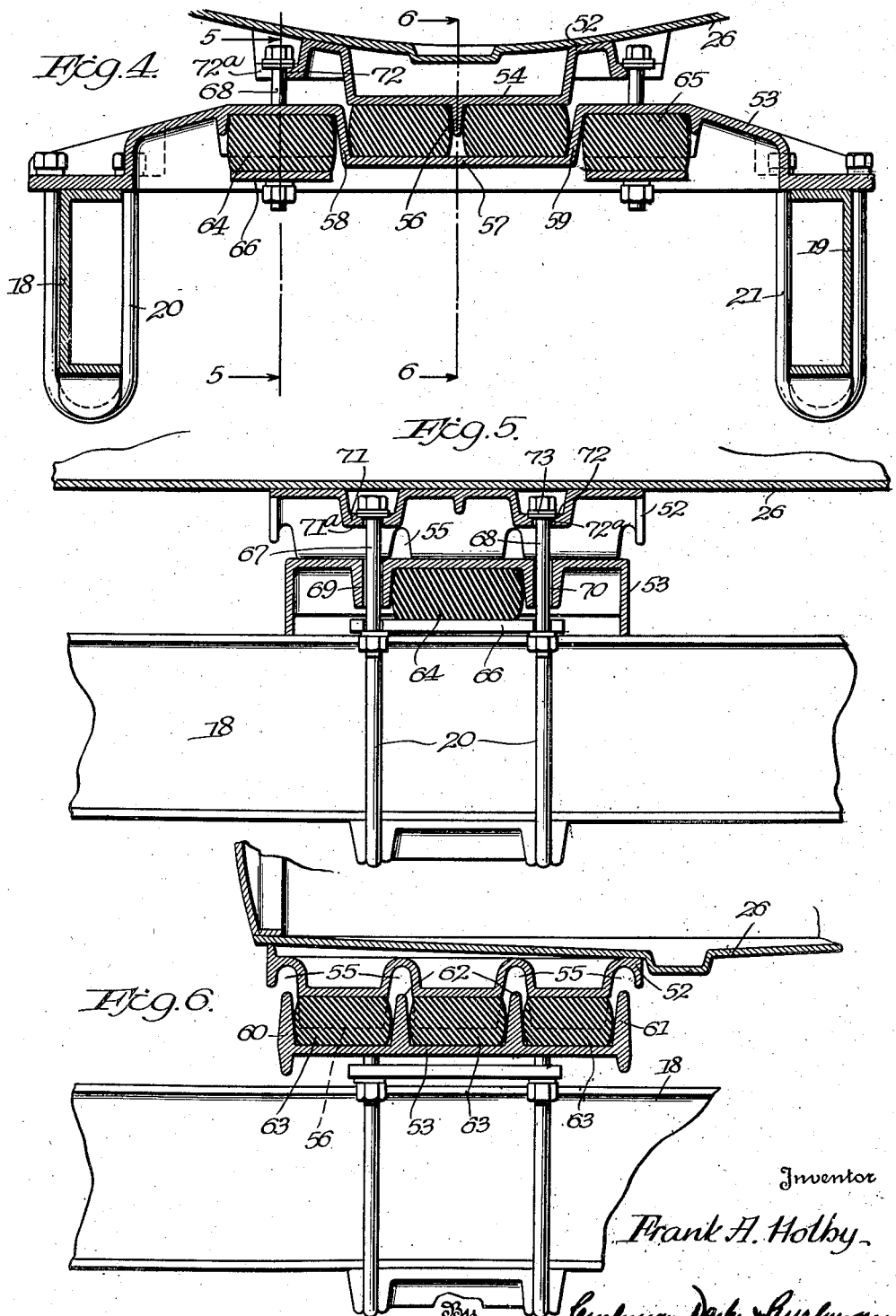

April 14, 1936.    F. A. HOLBY    2,037,024
TANK TRUCK
Filed April 7, 1934    4 Sheets-Sheet 4
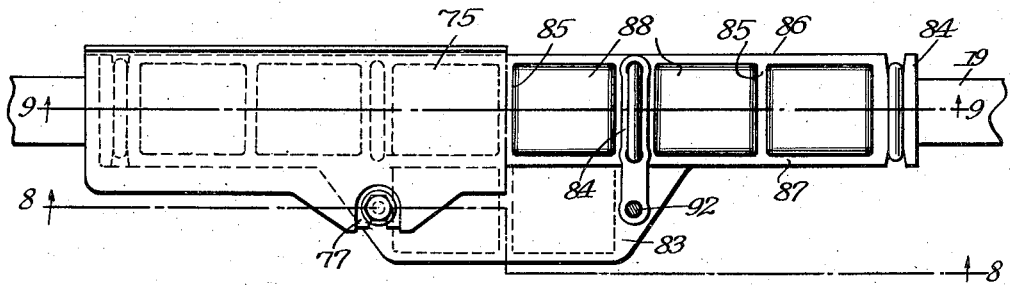
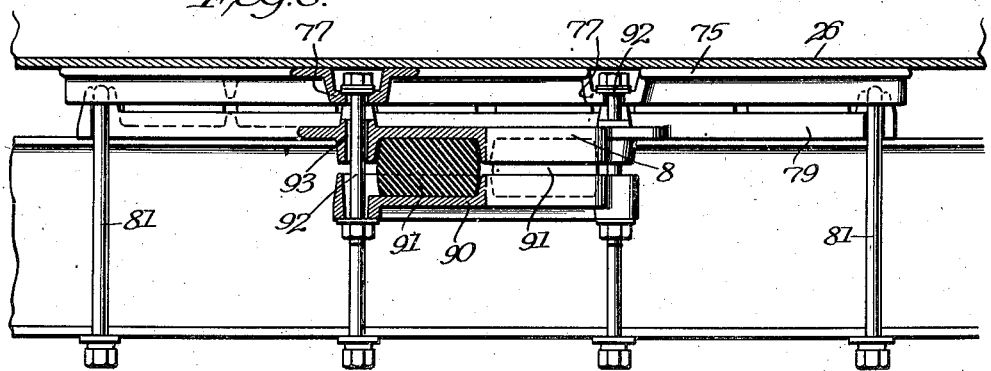
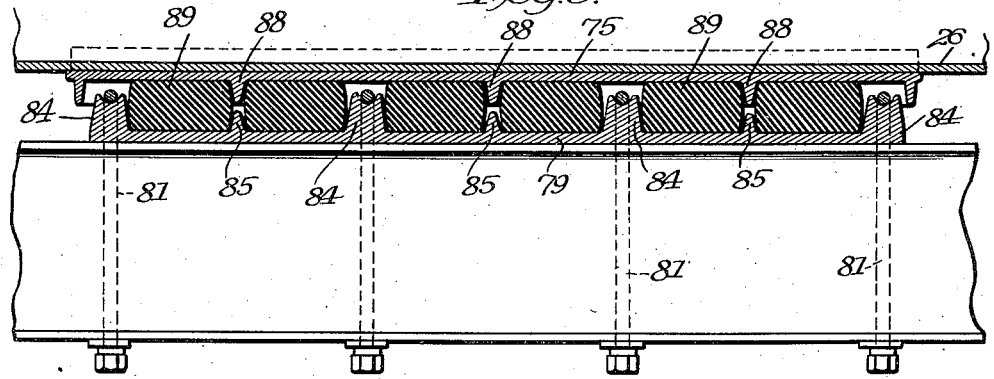
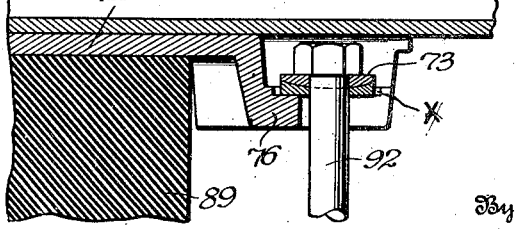
Inventor
Frank H. Holby Patented Apr. 14, 1936

2,037,024

UNITED STATES PATENT OFFICE 2,037,024

TANK TRUCK

Frank A. Holby, New York, N. Y., assignor, by mesne assignments, to The William F. Kenny Company, New York, N. Y., a corporation of New York Application April 7, 1934, Serial No. 719,568

6 Claims. (Cl. 280—5)

The present invention relates to tank truck construction wherein auxiliary tanks are provided in conjunction with the main tank, a plurality, preferably, of the auxiliary tanks being disposed beneath the main tank as supporting means for the latter. The invention also relates to a cushion supporting system and means for the main tank preferably interposed at least in part between the above mentioned bottom auxiliary tanks and the truck chassis.

This application is a continuation-in-part of my original application, Serial No. 664,255, filed April 3, 1933.

A practical embodiment of the invention is shown by way of example in the accompanying drawings, in which:—

Figure 1 is a side elevation of a tank truck constructed in accordance with the invention;

Figure 2 is a bottom plan view of the truck frame and tank;

Figure 4 is a section substantially on the line 4—4 of Figure 2;

Figure 5 is a section substantially on the line 5—5 of Figure 4;

Figure 6 is a section substantially on the line 6—6 of Figure 4;

Figure 7 is an elevation of a tank supporting unit partly broken away;

Figure 8 is an elevation of the unit of Figure 7, partly in section on line 8—8 of Figure 7;

Figure 9 is a section substantially on line 9—9 of Figure 7; and

Figure 10 is an enlarged view of a detail appearing in Figure 3.

Figure 3:
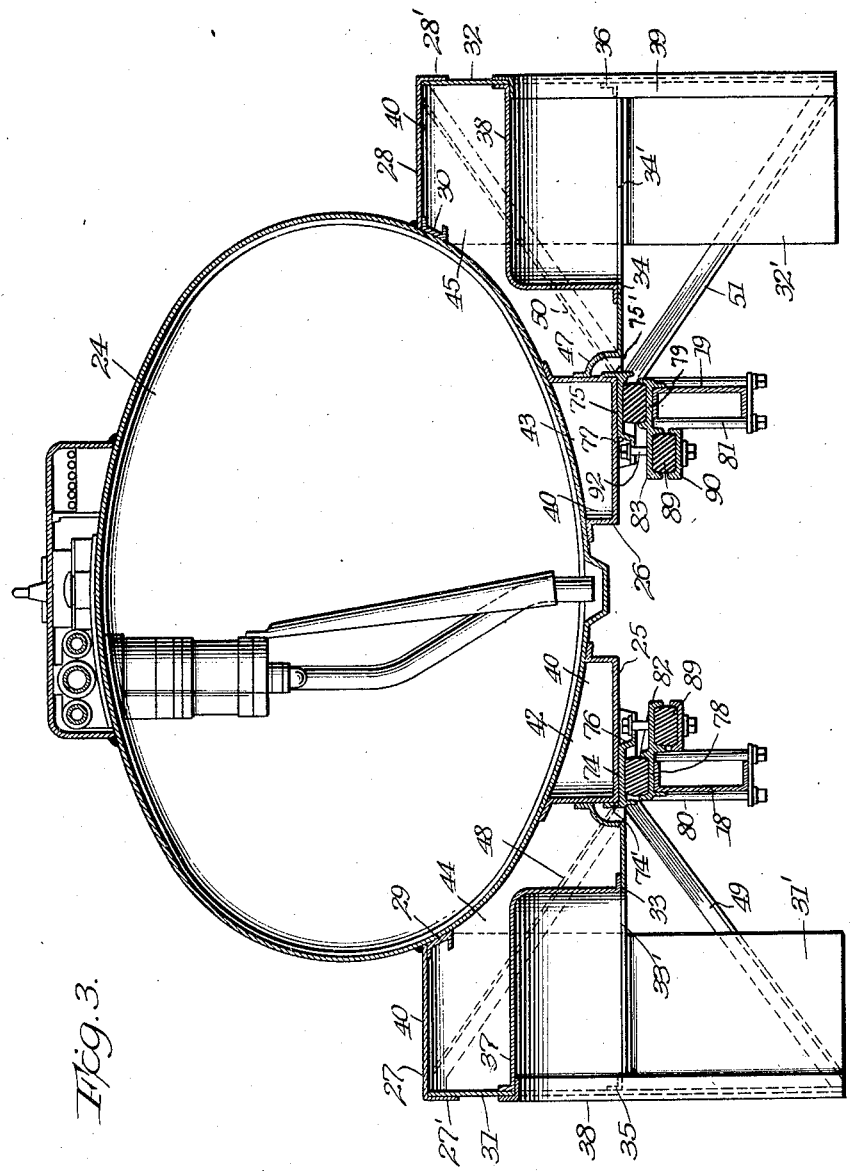
Figure 3 is a section substantially on the line 3—3 of Figure 2.

Referring to the drawings, reference numeral 15 designates generally a truck chassis which may be of any preferred design. As here shown, the chassis has an engine compartment 16 at its front end and behind this a cap 17. The chassis frame comprises essentially a pair of longitudinal members such as channel members 18 and 19, Figures 1, 2 and 3, the frame being supported on front and rear pairs of wheels as at 20 and 21 through the intermediary of springs as at 22 and 23. A main tank 24 of substantially the elliptical cross section shown in Figure 3, extends longitudinally of the frame to the rear of the cab 17. The tank is here shown extending a considerable distance rearwardly of the rear wheels as well as forwardly thereof.

A pair of trough-like members 25 and 26, Figures 2 and 3, are disposed beneath main tank 24 and have outwardly flanged side walls welded or otherwise suitably secured against the bottom wall of the tank. The side walls of members 25 and 26 are preferably of such height that their bottom walls are substantially horizontal and the members extend in parallel relation directly above longitudinal frame members 18 and 19.

Plates or strips 27 and 28 extend along the sides of the main tank in laterally projecting relation, these plates being of relatively heavy metal to serve as runways and having their inner edges welded to the sides of the main tank and also secured thereto through flange members such as shown at 29 and 30, Figure 3. The outer edges of plates 27 and 28 are turned downwardly to provide vertical flanges 27' and 28'. Vertical sheets 31 and 32 have their upper margins welded against flanges 27' and 28' and substantially horizontal sheets 33 and 34 extend from the vertical sheets 31 to and somewhat beneath members 25 and 26, respectively, to be welded thereagainst. The outer edges of sheets 33 and 34 may be welded to sheets 31 and 32 through the intermediary of angle strips 35 and 36. Immediately above the rear wheels, plates 33 and 34 are provided with cut-outs 33' and 34', as shown in Figure 3, and the vertical plates 31 and 32 are arcuately recessed. Wheel hoods 37 and 38 are set in the openings thus formed and have flanged edges welded to the vertical and horizontal sheets, respectively. The arcuate cut-outs in the vertical plates 31 and 32 are preferably rimmed by angle members 38' and 39.

Sheets 31 and 32 preferably extend throughout the length of the main tank as shown in Figures 1 and 2. As here contemplated, however, members 25 and 26 terminate short of the ends of the main tank and plates 33 and 34 are of the same length as elements 25 and 26. End closure plates 40 and 41 close the ends of members 25 and 26 and also extend outwardly to plates 31 and 32 to close the ends of the spaces defined by plate 27, sheets 31 and 33, and plate 28 and sheets 32 and 34, respectively.

In this manner, four auxiliary tanks are provided and are designated generally by the reference characters 42, 43, 44 and 45, respectively, the main tank wall constituting wall portions of all of these auxiliary tanks and the outer walls of tanks 42 and 43 constituting inner wall portions of tanks 44 and 45. While plates 33 and 34 have their inner marginal portions for the most part secured beneath the bottom walls of tanks 42 and 43, as above mentioned, in the vicinity of the rear walls, these marginal portions are bent upwardly and inwardly and secured to the outside walls of tanks 42 and 43 to form pockets 46 and 47, Figures 2 and 3. Note that plates 33 and 34 have a horizontal portion, Figure 3, between wheel hoods 37 and 38 and pockets 46 and 47 so that fluid at either side of the wheel hoods has access to the other side. Inlet and discharge openings for the auxiliary tanks may be positioned as desired. The outlet openings will preferably be at the rear ends of the tanks and provided with faucets.

Plates 31 and 32 are extended as aprons below horizontal plates 33 and 34 and forwardly and rearwardly of plates 33 and 34 may be braced by suitable members as at 48, 49, 50, and 51. End aprons as at 31' and 32' may be provided.

Immediately forward of tanks 42 and 43, a cradle member 52 is secured to the bottom of the main tank 26 and beneath this cradle member a bolster 53 extends across longitudinal frame members 18 and 19 and is secured thereto by means of U-bolts 20 and 21. Cradle 52 has a lower horizontal face 54 localized with respect to the central longitudinal line of the truck frame and formed with a plurality of transversely extending hollow ribs which provide bottom recesses 55, Figure 6. A downwardly projecting rib 56 located in the central vertical plane of the truck frame extends below surface 54 and is interrupted by the hollow ribs as shown in Figure 6.

Bolster 53 is depressed immediately below surface 54 to provide a pocket 57. This pocket has the lateral walls 58 and 59, the front wall 60, the rear wall 61 and transversely extending ribs 62 intermediate walls 60 and 61, Figure 6. In the pockets defined by the various ribs are disposed compressible blocks 63 of rubber or other suitable material and in the various figures, these blocks are shown as being compressed as under load. Further compression is, however, possible and surface 54 of cradle 52 is adapted to enter to a limited extent into pocket 57, recesses 55 providing clearance for elements 60, 61 and 62 of the bolster. Rib 56 and side walls 58 and 59 engage the blocks so as to transmit to the latter lateral shearing stresses. Any unusual relative movement of the cradle relative to the bolster in a fore and aft direction is positively limited by abutment of bolster elements 60 to 62 with the walls of the respective recesses 55. As here shown, weight is transmitted by the cradle to the bolster through six compressible blocks but it will be understood that the number and arrangement of these blocks can be varied as desired. However, according to a particular feature of the present invention, the blocks are localized with respect to the central longitudinal line of the truck frame so as to provide a substantially single point support for the tank.

Outwardly of pocket 56, the bolster is provided on its lower side with a pair of pockets in which are seated rebound blocks 64 and 65, respectively. A stirrup plate 66 is disposed beneath block 64 and through apertures in its ends are passed a pair of bolts or tie rods 67 and 68 which pass upwardly freely through apertures in the bolster, these apertures being indicated at 69 and 70, Figure 5, and being shown as passing through front and rear positioning ribs for the block 64. The upper ends of bolts 67 and 68 are engaged in slots 71a and 72a formed in the depressed bottom walls 71, 72 of outwardly open pockets of the cradle at the side of the latter, the heads of the bolts resting on washers 73. Washers 73 comprise upper and lower portions having spherical mating surfaces so that relative swivelling is permitted, this being particularly shown in Figure 10. The washers are engaged in recesses as at X, Figure 10, of more than semi-circular extent so that with the tie bolts tightened they are held against accidental movement out of the slots.

Blocks 64 and 65 not only check rebound but serve also to hold the tank yieldingly against rolling movement about a longitudinal axis. It will be understood that block 65 is in connection with the cradle at its other side in the manner just described with reference to block 64.

Referring particularly to Figures 1 to 3 and 7 to 9, brackets 74 and 75 are secured to the lower surface of members 25 and 26, these brackets extending as here shown, Figures 1 and 2, a substantially equal distance fore and aft of the axis of the rear wheels. These brackets have upright flanges 74' and 75' seated against the lower marginal portion of the outer walls of members 25 and 26 and received in pockets 46 and 47. The brackets also have inwardly extending downwardly offset portions as at 76 and 77 for the reception of tie bolt heads and washers in the manner above described, Figure 10 being a section through offset portion 76. Lower brackets 78 and 79 extend immediately beneath the upper brackets and are secured on top of the longitudinal frame members 18 and 19 by means of U-bolts 80 and 81. Brackets 78 and 79 have inward extensions 82 and 83. Since the bracket members and their appurtenances on each side of the frame are identical, description of one unit will suffice, and reference will now be made solely to the right hand unit shown in Figures 7 to 9.

As shown most clearly in Figure 9, the lower bracket member 79 has a plurality of transverse ribs 84 between which are positioned the shorter transverse ribs 85, the U-bolts 81 being seated in the recessed tops of ribs 84. Ribs 84 and 85 extend between side walls 86 and 87 so that a plurality of aligned pockets are defined, six being here shown by way of example.

Bracket 75 has peripheral walls or flanges adapted to overlap the peripheral walls of the lower bracket and is provided with a plurality of transverse ribs 88 immediately above ribs 85. In the aligned pockets thus formed are disposed cushion blocks 89 similar to those above described. Beneath extension 83 of the lower bracket member a plurality of pockets are defined in longitudinal alignment and a stirrup plate 90 below extension 83 is formed with a plurality of pockets registering with those of the extension. In these pockets are disposed a pair of compressible rebound blocks 91 identical with those above described. Tie rods 92 extend through apertures as at 93 formed in extension 83 and connect the plate 90 with the depressed extension portions 77 of the top bracket member 75. In the various views the compressible blocks are assumed to be shown under load conditions.

Blocks 89 serve as load transmitting means between the upper and lower brackets and serve also as means for taking shearing stresses since their upper and lower portions are engaged in pockets in the upper and lower brackets. Blocks 91 serve as rebound checks and also hold the tank against rolling movements about a longitudinal axis.

The two series of blocks 89 are relatively widely spaced, being respectively adjacent the wheels of the rear pair of wheels. They thus form two transversely spaced supporting means for the rear portion of the tank so that in conjunction with the forward supporting means above described, a substantially three-point cushion mounting is provided. The two-point support is preferably provided at the rear, one reason for this being that the cushioning means being preferably located directly above the rear axle, and the tank extending a considerable distance to the rear thereof, a major portion of the tank weight is thus carried by the rear supporting means. Weight transmitting means of greater capacity are thus required for the rear portion of the tank than for its front end. It will be understood that while six compressible blocks have been shown at each side for the support of the rear portion of the tank, a greater or smaller number may be provided as conditions demand. Also, while these cushioning means have been shown in longitudinal alignment at each side, as a preferred arrangement, other arrangements may be adopted so long as the support for the tank is more or less localized at the two transversely spaced points.

From the above it will be seen that I have provided a tank truck of considerable capacity, additional capacity being provided by auxiliary tanks built in conjunction with the main tank and serving to rigidify the latter to a considerable extent. Also, I have provided a novel arrangement and form of cushion means affording a substantially three-point mounting so that torsional strains on the tank are substantially eliminated. The rear cushioning means are preferably interposed between the truck frame and the bottom auxiliary tanks 42 and 43 which latter thus serve to distribute stresses to the main tank.

It will be understood that various changes are possible in the described construction and arrangement without departure from the scope of the invention. Consequently, I do not limit myself in these respects except as in the following claims.

I claim:—

1. A tank truck comprising a chassis including a frame sprung on front and rear pairs of wheels and a tank extending fore and aft of the rear pair of wheels above said frame, a transversely extending series of cushion blocks interposed between the tank and frame at the front end of the former and localized with respect to the central longitudinal line of the frame, longitudinally extending series of cushion blocks interposed between the tank and the frame and localized at a pair of points between the rear wheels and respectively relatively closely adjacent the rear wheels, whereby a substantially three point cushion mounting for the tank is provided, seats secured to the frame and on which said blocks rest, rebound cushioning blocks at the ends of said transversely extending series of blocks, rebound cushioning blocks spaced transversely of the chassis in the vicinity of the rear wheels, downwardly faced seats for said rebound blocks, said last named seats being parts of the first named, and tension members connecting said rebound blocks and the tank.

2. In a tank truck comprising a chassis including a frame and a tank extending longitudinally of said frame thereabove, means for supporting the tank on the frame including a bolster secured across the frame, a saddle secured to the bottom of the tank above the bolster, compressible blocks interposed between the bolster and saddle for the support of the tank, compressible rebound blocks seated against the lower side of said bolster in relatively widely spaced relation, and tie rods connecting said rebound blocks and the saddle.

3. In a tank truck comprising a chassis including a frame and a tank extending longitudinally of said frame thereabove, means for supporting the tank on the frame including a bolster secured across the frame, a saddle secured to the bottom of the tank above the bolster, compressible blocks interposed between the bolster and saddle for the support of the tank, said blocks being localized with respect to the central longitudinal line of the frame, compressible rebound blocks seated against the lower side of said bolster outwardly of said first-named blocks, and tie rods extending freely through openings provided in the bolster and connecting the rebound blocks and saddle.

4. In a tank truck comprising a chassis including longitudinal frame members and a tank extending longitudinally of said frame members thereabove, means for supporting the tank on said frame members including lower brackets secured to the tops of said frame members and extending longitudinally thereof, top brackets secured to the tank therebeneath and extending above the lower brackets, compressible blocks interposed between said brackets for the support of the tank, lateral extensions on said lower brackets, compressible rebound blocks seated against the lower sides of said extensions, and tie means connecting said blocks and the top brackets.

5. Tank supporting means for tank trucks including upper and lower members provided with a plurality of opposed pockets, compressible blocks disposed in said pockets to transmit to the lower member weight imposed on the upper member and to absorb shearing stresses, a pocket on the under side of the lower member, a compressible rebound block in the last named pocket, and tie means connecting said rebound block and said top member.

6. Tank supporting means for tank trucks including upper and lower members of which one is provided with a plurality of spaced ribs projecting toward the other member, compressible blocks disposed between said ribs and positioned thereby, and recesses in said other member receiving said ribs upon approach of said members under load.

FRANK A. HOLBY.